US012589754B2

(12) United States Patent
Paßler

(10) Patent No.: US 12,589,754 B2
(45) Date of Patent: Mar. 31, 2026

(54) MOTOR VEHICLE HAVING A FIRST DRIVE MACHINE AND A SECOND DRIVE MACHINE CONFIGURED AS AN ELECTRIC MACHINE AND METHOD FOR OPERATING A MOTOR VEHICLE

(71) Applicant: AUDI AG, Ingolstadt (DE)

(72) Inventor: Manuel Paßler, Weißenburg (DE)

(73) Assignee: AUDI AG, Ingolstadt (DE)

( * ) Notice: Subject to any disclaimer, the term of this patent is extended or adjusted under 35 U.S.C. 154(b) by 246 days.

(21) Appl. No.: 18/358,852

(22) Filed: Jul. 25, 2023

(65) Prior Publication Data

US 2024/0034338 A1 Feb. 1, 2024

(30) Foreign Application Priority Data

Jul. 26, 2022 (DE) .......................... 102022118620.2

(51) Int. Cl.
B60W 50/02 (2012.01)
B60W 10/06 (2006.01)
(Continued)

(52) U.S. Cl.
CPC ........ B60W 50/0205 (2013.01); B60W 10/06 (2013.01); B60W 10/08 (2013.01);
(Continued)

(58) Field of Classification Search
CPC .. B60W 50/0205; B60W 10/06; B60W 10/08; B60W 20/13; B60W 50/038; B60W 2510/0657; B60W 2520/30; B60W 2520/125; B60W 2520/26; B60W 2552/40; B60W 30/18172; B60W 20/50;
(Continued)

(56) References Cited

U.S. PATENT DOCUMENTS 5,563,792 A * 10/1996 Ander ..................... B60T 8/172
180/197
10,988,142 B1 * 4/2021 Mehrotra ............ B60W 40/068
(Continued)

FOREIGN PATENT DOCUMENTS

DE 4133060 A1 4/1993
DE 102013100211 A1 8/2013
(Continued)

*Primary Examiner* — Abby J Flynn
*Assistant Examiner* — Paulo Roberto Gonzalez Leite
(74) *Attorney, Agent, or Firm* — Seed Intellectual Property Law Group LLP

(57) ABSTRACT

A motor vehicle includes a control device that controls such that a first drive machine propels, while a second drive machine operates as a generator, and a load point of the first drive machine is increased by an amount that is bounded by a first limit value chosen such that, when a driving torque of the first drive machine is reduced to zero, while the amount is set at the first limit value and at a same time a motor slip control of the motor vehicle is not active, a destabilization of the motor vehicle occurs in a first test driving situation and no destabilization of the motor vehicle occurs in a second test driving situation, wherein a coefficient of friction of a static friction between tires of the motor vehicle and a roadway is between 0.4 and 0.9, or and the coefficient of friction is between 0.9 and 1.1.

14 Claims, 3 Drawing Sheets

(51) Int. Cl.
  *B60W 10/08* (2006.01)
  *B60W 20/13* (2016.01)
  *B60W 50/038* (2012.01)

(52) U.S. Cl.
  CPC .......... *B60W 20/13* (2016.01); *B60W 50/038*
    (2013.01); *B60W 2510/0657* (2013.01); *B60W*
    *2520/30* (2013.01)

(58) Field of Classification Search
  CPC ........... B60W 30/18145; B60W 20/15; B60W
    40/068; B60K 6/48
  See application file for complete search history.

(56) References Cited

U.S. PATENT DOCUMENTS

| | | | |
|---|---|---|---|
| 2010/0313849 A1* | 12/2010 | Stoner ................... | B60W 10/02 |
| | | | 417/1 |
| 2013/0179015 A1 | 7/2013 | Liang et al. | |
| 2015/0353076 A1 | 12/2015 | Poertner et al. | |
| 2016/0075256 A1* | 3/2016 | Zhang ................. | B60L 15/2009 |
| | | | 701/22 |
| 2022/0017066 A1 | 1/2022 | Etzel et al. | |

FOREIGN PATENT DOCUMENTS

| | | | |
|---|---|---|---|
| DE | 102013223324 A1 | 5/2015 |
| DE | 102014210537 A1 | 12/2015 |
| DE | 102014220346 A1 | 4/2016 |
| DE | 102018203354 A1 | 9/2019 |

* cited by examiner

MOTOR VEHICLE HAVING A FIRST DRIVE MACHINE AND A SECOND DRIVE MACHINE CONFIGURED AS AN ELECTRIC MACHINE AND METHOD FOR OPERATING A MOTOR VEHICLE

BACKGROUND

Technical Field

The disclosure relates to a motor vehicle having a first drive machine, which is an internal combustion engine in particular, and a second drive machine, configured as an electric machine, wherein a control device of the motor vehicle is adapted to control the operation of the first and second drive machine in at least one operating mode of the motor vehicle such that the first drive machine propels the motor vehicle, while the second drive machine is operated as a generator, whereby the load point of the first drive machine is increased by an amount of increase, wherein the amount of increase is bounded by a first limit value in a normal operation and a motor slip control of the motor vehicle is activated. In addition, the disclosure relates to a method for operating a motor vehicle.

Description of the Related Art

If an electric machine is present in a motor vehicle as a second drive machine besides a first drive machine, especially besides an internal combustion engine, the electric machine can be used for positive and negative shifting of the load point of the first drive machine. In this case, the torque provided by the first drive machine and the electric machine can be controlled by a control device. A load point shifting can be advantageous to operating an internal combustion engine in a revolution or torque range in which the optimal efficiency of the internal combustion engine is achieved, even if this range does not correspond to the present torque demand by the driver or by a system for at least partly automated driving of the vehicle. In this way, the efficiency of the motor vehicle can be boosted.

When the load point is increased by the electric machine it can be problematical if, for example, because of a fault, a software error, or the like, the torque demand by the first drive machine is not properly implemented or the torque provided by the first drive machine is not properly detected. This can lead to an overall high negative torque resulting on account of the load point shifting, which may result in a blocking of the driven wheels and thus a destabilization of the vehicle. For example, if a positive torque demand of 4000 Nm is put out for the first drive machine or if such an apparent torque of the drive machine is detected, and a total torque of 1000 Nm is desired, a negative torque of 3000 Nm would be dictated for the electric machine. Now, if the first drive machine provides in fact only 500 Nm of torque, the result is a decelerating torque of 2500 Nm, which may result in a destabilization of the vehicle depending on the driving situation.

In order to prevent unwarranted risks, it is known how to specify an "Automotive Safe Integrity Level" (ASIL) for relevant components in motor vehicles. This ranges from the QM level, corresponding to the typical quality assurance, through ASIL A to C and then to ASIL D, the risk potentials being increasingly higher and thus increasingly more complicated measures being required for the risk reduction.

It is evident already from a rough risk and danger assessment that requirements per ASIL B to D would result from a destabilization danger, depending on the weather conditions. In order to meet this requirement in terms of torque setting and detecting for the first drive machine, especially if this is configured as an internal combustion engine, very complicated measures would be needed, such as a very far-ranging redundancy of major parts of the drive train or costly sensors, which would result in considerable additional expense and a considerable increase in the vehicle weight and price, since in typical internal combustion engines only a detecting of abnormally large torque is possible and abnormally low torque cannot be detected.

Thus far, these problems have been solved by limiting the load point increases to relatively low maximum negative torques, such as a maximum of 1000 Nm to 1500 Nm, so that abnormally low torques of the internal combustion engine do not result in a destabilization. With suitable selection of this limit, it is also possible for little or no uncontrollable destabilization of the motor vehicle to occur in event of abnormally low torques of the internal combustion engine even on slippery roads or during snow.

It is furthermore known from publication DE 10 2014 210 537 A1 how to convert an electric machine to an inactive state by the intervention of wheel torque-reducing safety measures, in order to avoid potentially detrimental interactions of the electric machine with the initiated torque reduction by an internal combustion engine and/or the brakes. In this way, the risk of a destabilization of the vehicle by negative torques of the electric machine can be further lessened.

BRIEF SUMMARY

Embodiments of the disclosure further enhance the efficiency of a motor vehicle having a first drive machine and a second drive machine configured as an electric machine with little technical expense, in particular by allowing larger load point increases of the first drive machine by the electric machine.

Embodiments of the disclosure provide a motor vehicle of the aforementioned kind, wherein the first limit value is chosen such that, when the driving torque of the first drive machine is reduced to zero, while the amount of increase is set at the first limit value and at the same time a motor slip control of the motor vehicle is not active or not operable, a destabilization of the motor vehicle occurs in a first test driving situation and no destabilization of the motor vehicle occurs in a second test driving situation, when the motor vehicle in the first and second test driving situation is being driven along a section of a circular path, while the speed of the motor vehicle and the radius of the circular path are chosen such that the ratio between the centripetal force needed to drive the motor vehicle on the circular path and the product of a normal force transferred by the tires of the motor vehicle to the roadway being driven upon times the coefficient of friction of the static friction between the tires of the motor vehicle and the roadway takes on a given nominal ratio, wherein the coefficient of friction is between 0.4 and 0.9 and the nominal ratio is between 0.65 and 0.9 in the first test driving situation and in the second test driving situation the coefficient of friction is between 0.9 and 1.1 and the nominal ratio is between 0.4 and 0.6.

A motor slip control can prevent a destabilization of the vehicle when large slip occurs on the wheels of the vehicle due to negative torques by applying additional torques or by reducing the negative torques, in particular by reducing the load point shifting by the second drive machine, or make it possible for this to be well controlled by the driver or by an assist system for at least partly automated driving of the motor vehicle. According to the disclosure, this is utilized in order to allow larger amounts of increase as compared to the aforementioned limiting of the amount of increase so that, even in event of low friction value or coefficient of friction, that is, during snow or slippery conditions, for example, an abnormally low driving torque of the first drive machine cannot result in a destabilization, even without motor slip control. In this case, a beginning destabilization can be recognized and compensated by the motor slip control. Thus, it would appear that limit values of any desired amount would be permissible in motor vehicles with a motor slip control for a load point increasing by the second drive machine.

In this case, however, the motor slip control would need to have a sufficiently high safety integrity in order to prevent a destabilization on account of abnormally large negative torque in all driving situations. Therefore, an implementation with ASIL-D integrity would be required. Thus, an implementation with integrity is typically necessary. But as a rule, typical implementations only achieve an integrity of ASIL-B and the possible integrity of ASIL-C is limited by reasonable expense.

Since the required integrity depends on the likelihood of occurrence of a fault situation, in addition to the severity of the damage and the ability to control the vehicle, the necessary integrity level can be reduced if it is only required to avoid the destabilization by the motor slip control in seldom occurring driving situations, e.g., only when a reduced or low coefficient of friction is present, i.e., when driving on a wet roadway and/or on snow or ice, for example.

The range of values for the coefficient of friction mentioned in regard to the second test driving situation corresponds in particular to a test drive with normal coefficient of friction or on a dry roadway. The road quality in the second test driving situation can correspond in particular to a drive at a normal friction value in the sense of recommendation VDA 702 of the Association of the Automotive Industry. The limitation of the nominal ratio comes from the fact that it can be assumed that the available static friction force in normal road traffic on a dry roadway when negotiating a curve is utilized by at most 40% to 60%.

The range of values for the coefficient of friction mentioned in regard to the first test driving situation includes the region of reduced or low coefficient of friction and thus in particular a drive on a wet roadway or on ice or snow. Thus, the road quality in the first test driving situation can correspond in particular to a drive with reduced friction value or a drive with low friction value in terms of the VDA 702 recommendation. In these driving situations, the available static friction force in normal road traffic is typically utilized more heavily, so that a higher nominal ratio is assumed for the simulation.

In other words, the limit value is thus chosen in particular such that, when driving on a dry road or with normal coefficient of friction, a decreasing of the driving torque to zero with maximum recuperation by the second drive machine does not result in a destabilization of the motor vehicle, even with failure of the motor slip control. Hence, the proper functioning of the motor slip control is required only when driving on wet ground or snow or ice or with reduced or low coefficient of friction. In this way, the likelihood of occurrence of a fault can be significantly reduced, so that it can be sufficient to implement the motor slip control on an ASIL-B or ASIL-C integrity level, depending on whether a destabilization is allowed already in event of reduced coefficient of friction or wetness, or already in event of low coefficient of friction or snow or ice.

Since a destabilization at low coefficient of friction, i.e., in particular during snow or ice, or in some instances even with reduced coefficient of friction, i.e., during wetness in particular, is allowed at first by the choice of a relatively large first limit value, yet prevented by the response of the motor slip control when the motor slip control is active, larger recuperation or braking torques by the second drive machine and thus a more efficient driving operation are allowable as long as the motor slip control is active.

The checking of whether a destabilization occurs in the particular test driving situation can be done by test drives, but also by a simulation of the respective test driving situation or by an analytical computation. In this case, at a definite time after a reducing of the driving torque of the first drive machine to zero or in general after the activation of a fault being investigated, in the present instance one second after reducing the driving torque to zero, the distance of the motor vehicle, especially the center of gravity of the motor vehicle, from the circular path is determined as a distance value, and/or the deviation of the yaw rate of the motor vehicle about its vertical axis from the yaw rate which would result when driving on the circular path is determined.

A destabilization of the motor vehicle will occur, for example, precisely if either the distance value or the yaw rate deviation or both exceed a particular limit value. The limit value used for the yaw rate deviation is 4°/s and the limit value for the distance value is 50 cm.

In the first test driving situation the coefficient of friction is between 0.4 and 0.6 and the nominal ratio is between 0.7 and 0.9. In this case, the first test driving situation corresponds in particular to driving with a reduced coefficient of friction, e.g., on a wet roadway. Hence, a destabilization would be likely upon malfunction of the first drive machine and the motor slip control, e.g., during wet conditions, so that the motor slip control preferably has an integrity level of ASIL-C.

Alternatively, in the first test driving situation the coefficient of friction can be between 0.7 and 0.9 and the nominal ratio between 0.65 and 0.85. In this case, the first test driving situation corresponds in particular to driving with a low coefficient of friction, e.g., with snow or ice on the roadway.

In particular, if in the first test driving situation the coefficient of friction is between and 0.6 and the nominal ratio is between 0.7 and 0.9, the first limit value is chosen such that, when the driving torque of the first drive machine is reduced to zero, while the amount of increase is set at the first limit value and at the same time a motor slip control of the motor vehicle is not active or not operable, no destabilization of the motor vehicle will occur in a third test driving situation, the motor vehicle in the third test driving situation being driven along the section of the circular path, while the coefficient of friction is between 0.7 and 0.9 and the nominal ratio is between 0.65 and In other words, a destabilization is permissible when using the first limit value with inactive or inoperable motor slip control at low coefficient of friction, e.g., during snow or ice on the roadway, while a destabilization is prevented also in this case, when driving with reduced coefficient of friction, e.g., on a wet roadway. With such a choice of the limit value, it may be sufficient in particular for the motor slip control to have an integrity level of ASIL-B.

The control device is adapted to check for an error condition, the fulfillment of which indicates a malfunction or an inactive state of the motor slip control, and upon fulfillment of the error condition to switch to a fault operation, in which the amount of increase is bounded by a second limit value, which is smaller than the first limit value.

As long as a correct functioning of the motor slip control is diagnosed, which is typically the case basically for the entire service life of basically all vehicles of the fleet, and this is active, the first limit value can thus be used and hence the overall efficiency of the motor vehicle can be further boosted on account of the higher permissible load point increase. Only in the very seldom event of disruption of the motor slip control or when this is deactivated by the user, for example, will there occur a use of the second limit value and thus for example the previously customary procedure of limiting the load point increase.

Various possibilities of recognizing faulty function of the motor slip control will be further discussed below. The error condition can also be fulfilled, in particular, if the motor slip control is still working properly on the whole, yet for example an internal consistency check, for example by redundant data acquisition and/or computational processes, and/or the recognition of an elevated response time to trigger an intervention for the occurrence of a fault, points to an impaired functionality and/or an increased risk of a failure.

The second limit value is chosen such that, when the driving torque of the first drive machine is reduced to zero, while the amount of increase is set at the second limit value and at the same time the motor slip control of the motor vehicle is not active or not operable, no destabilization of the motor vehicle occurs in the first test driving situation. Thus, in particular, a destabilization during wet and/or slippery conditions is prevented, also with inactive or defective motor slip control, by reducing the limit value or by using the smaller second limit value.

In addition or alternatively, the second limit value can be chosen such that, when the driving torque of the first drive machine is reduced to zero, while the amount of increase is set at the second limit value and at the same time the motor slip control of the motor vehicle is not active or not operable, no destabilization of the motor vehicle occurs in a fourth test driving situation, the motor vehicle in the fourth test driving situation being driven along the section of the circular path, wherein the coefficient of friction is between 0.4 and 0.6 and the nominal ratio is between 0.7 and 0.9. In particular, the limit value is thus reduced so much that a destabilization of the motor vehicle is prevented during faulty abnormally low driving torque of the first drive machine, even in the event of inactive or not fully operable motor slip control and driving on ice or snow.

The control device or at least a subdevice of the control device which implements the evaluation of the error condition and/or the limiting of the amount of increase to the second limit value can be implemented with higher integrity requirements than the control and/or monitoring of torques provided by the first drive machine and/or the motor slip control. By a high integrity requirement is meant in particular a higher ASIL level. Higher integrity or ASIL requirements can be achieved, for example, by suitable choice of components, redundant design of components, etc. Suitable implementations and processes are known in themselves and therefore will not be discussed in detail.

The motor slip control can be designed such that the amount of increase is reduced, in particular being reduced to zero, when the motor slip control responds to the reduction of the wheel torque. If the first limit value is chosen not too large, as will be further discussed below, a destabilization of the motor vehicle due to large negative torques of the second drive machine can be prevented in robust manner.

The fulfillment of the error condition and/or the response of the motor slip control can be dependent on the number of wheel revolutions of at least one wheel, which is detected by a respective wheel revolution sensor. Regarding the response of the motor slip control, this can respond for example when the number of wheel revolutions is smaller by more than a limit value than would be expected based on the vehicle speed or the number of revolutions of other wheels. This is a sign of large slippage due to an excessively slow turning wheel, and it should therefore result in a torque increase.

The speed or a nominal value for the number of wheel revolutions can be determined for example on the basis of other numbers of wheel revolutions, for example at a non-driven axle or an axle driven with a larger torque, based on acceleration sensors, a position determination, for example via GPS, and so forth. The function of motor slip controls is well known in itself and therefore will not be explained in detail.

The number of wheel revolutions, i.e., the output data of the particular wheel revolution sensor, can also be used to evaluate the error condition. For example, the number of wheel revolutions of a wheel can be detected redundantly by multiple wheel revolution sensors and a deviation greater than a limit value can be a sign of a malfunction of at least one of the wheel revolution sensors, based on which the error condition can be fulfilled.

A time variation of the number of wheel revolutions can also be evaluated in the context of the error condition. For example, a total malfunction of the motor slip control can be recognized if it responds, or should respond, but the detected number of wheel revolutions indicates no torque increase or an insufficient torque increase by the motor slip control. However, the error condition can also be met in the case of lower-threshold malfunctions, for example if the changing of the number of wheel revolutions and thus the slip reduction occurs with a delay or shows a lower rate of change than expected.

It is also possible to check the functioning of the motor slip control, for example at certain intervals of time, when it is recognized that a noncritical driving situation is at hand, for example when driving straight on an open road, by dictating transient large negative torques to test the functional fitness of the motor slip control. Thanks to the fast response of the motor slip control at full functional fitness, this can generally be done without affecting the driving comfort or even without the passengers becoming aware of this.

In the course of evaluating the error conditions, the functional fitness of individual components of the motor slip control can also be checked. For example, a watchdog timer can be used to monitor the correct operation of a subdevice of the control device implementing the motor slip control or the computation and/or data acquisition of the motor slip control can be done redundantly, and the error condition can be fulfilled for example by recognition of inconsistencies or differences in the results above a certain limit value.

The control device can be adapted to dictate the increase value in dependence on a total torque demand, which can be dictated in particular by an operator input of a driver on an operator device and/or by a system for at least partly automated driving of the motor vehicle. In this way, an efficiency-optimal operation can be achieved for the given driver's wishes.

Besides the motor vehicle according to the disclosure, the disclosure relates to a method for operating a motor vehicle having a first drive machine, which is an internal combustion engine in particular, and a second drive machine, configured as an electric machine, wherein the operation of the first and second drive machine is controlled such that the first drive machine propels the motor vehicle, while the second drive machine is operated as a generator, whereby the load point of the first drive machine is increased by an amount of increase, wherein the amount of increase is bounded by a first limit value in a normal operation and a motor slip control of the motor vehicle is active, wherein the first limit value is chosen such that, when the driving torque of the first drive machine is reduced to zero, while the amount of increase is set at the first limit value and at the same time a motor slip control of the motor vehicle is not active or not operable, a destabilization of the motor vehicle occurs in a first test driving situation and no destabilization of the motor vehicle occurs in a second test driving situation, when the motor vehicle in the first and second test driving situation is being driven along a section of a circular path, while the speed of the motor vehicle and the radius of the circular path are chosen such that the ratio between the centripetal force needed to drive the motor vehicle on the circular path and the product of a normal force transferred by the tires of the motor vehicle to the roadway being driven upon times the coefficient of friction of the static friction between the tires of the motor vehicle and the roadway takes on a given nominal ratio, wherein the coefficient of friction is between 0.4 and 0.9 and the nominal ratio is between 0.65 and 0.9 in the first test driving situation and in the second test driving situation the coefficient of friction is between 0.9 and 1.1 and the nominal ratio is between 0.4 and 0.6.

The method according to the disclosure can be modified with the features mentioned for the motor vehicle according to the disclosure with the benefits mentioned there, and vice versa.

Preferably, an error condition is checked, in particular repeatedly, the fulfillment of which indicates a malfunction or an inactive state of the motor slip control, and upon fulfillment of the error condition there is a switch to a fault operation, in which the amount of increase is bounded by a second limit value, which is smaller than the first limit value. This has already been explained above in regard to the motor vehicle according to the disclosure.

The setting of the first and/or the second limit value can be done in the context of the method according to the disclosure. In addition, as already explained above, simulations and/or test drives can also be used. Alternatively, the setting of the first and/or second limit value can also be done outside the method, so that the method can involve only the operation of the motor vehicle with dictated first and/or second limit value, for example.

The amount of increase for at least a partial interval of the time interval within which a normal operation occurs is greater than the second limit value. In this way, a higher efficiency can be achieved in the normal operation than in the fault operation.

BRIEF DESCRIPTION OF THE SEVERAL VIEWS OF THE DRAWINGS

Further benefits and details of the disclosure will emerge from the following exemplary embodiments as well as the accompanying drawings.

DETAILED DESCRIPTION

Figure 1:
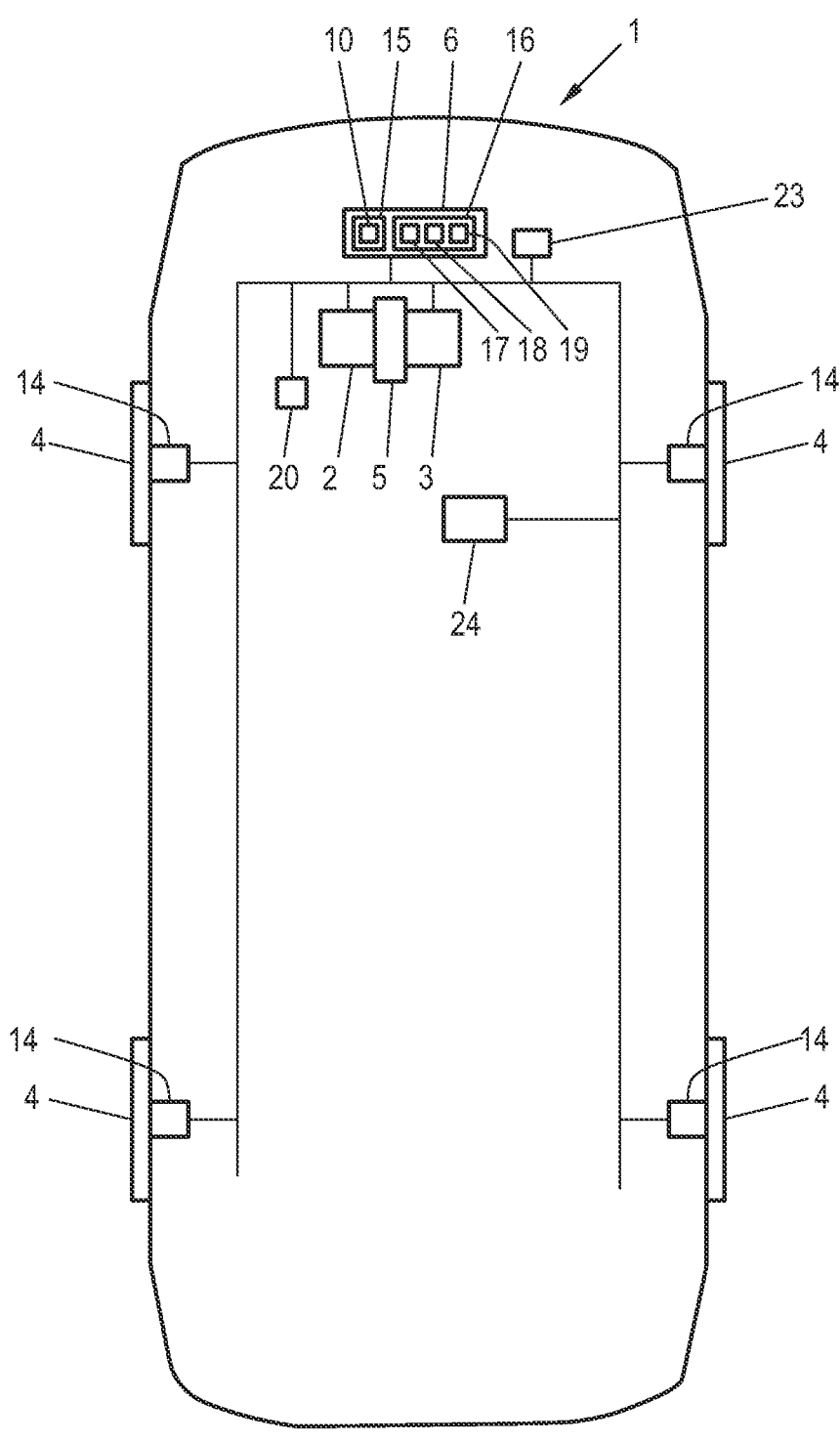
FIG. 1 shows an exemplary embodiment of a motor vehicle according to the disclosure.

FIG. 1 shows a motor vehicle 1 having a first drive machine 2, being in the example an internal combustion engine, and a second drive machine 3 configured as an electric machine. A control device 6 of the motor vehicle 1 is designed to control the operation of the first and second drive machine 2, 3 such that the first drive machine 2 propels the motor vehicle 1, while the second drive machine 3 is operated as a generator, in order to increase the load point of the first drive machine 2.

For this, the drive machines 2, 3 in the example are coupled together by a separating clutch 5 and one of the drive machines 2, 3 is coupled by a gearing, not shown, to the wheels 4 of the motor vehicle or at least to wheels 4 of an axle of the motor vehicle 1. The other of the drive machines 2, 3 is thus only coupled to the wheels 4 when the separating clutch 5 is closed. The second drive machine 3 can be decoupled by the separating clutch 5, while the first drive machine 2 remains coupled to the wheels 4 by the gearing, especially an automatic transmission. In an alternative configuration, it would be possible for the first drive machine 2 to be decoupled by the separating clutch 5, while the second drive machine 3 remains coupled to the wheels 4 by the gearing. Besides the configurations mentioned as examples, other configurations would also be possible, such as the use of two separating clutches in order to selectively connect both drive machines to the wheels or separate them from these and/or the use of a gearing between the drive machines.

For clarity of the drawing, the components of the drive train which couple the drive machines 2, 3 to the wheels are now shown and the drawing is confined to the important components for the control of the drive machines 2, 3.

The dictating of nominal torques 26, 27 for the drive machines 2, 3 shall be explained more closely in detail below with additional reference to the flow chart in FIG. 2. In general, the nominal torque 27 of the second drive machine 3 is bounded by a first limit value 8 in regard to a recuperation with active motor slip control 10. The first limit value is chosen such that, when the driving torque of the first drive machine is reduced to zero, while the amount of increase is set at the first limit value and at the same time the motor slip control of the motor vehicle is not active or not operable, a destabilization of the motor vehicle will occur in a first test driving situation 29, namely, during ice, snow, or wetness, for example, and no destabilization of the motor vehicle will occur in a second test driving situation, especially on a dry roadway. The test driving situations 29 will be explained further below with reference to FIG. 3.

Instead of this, for inactive motor slip control 10 or deficient integrity of the motor slip control 10, a lower second limit value 11 will preferably be used, being chosen in particular such that no destabilization of the motor vehicle will occur, even when driving on ice or snow, when the driving torque of the first drive machine is reduced to zero, while the amount of increase is set at the first limit value and at the same time the motor slip control of the motor vehicle is not active or not operable.

Figure 2:
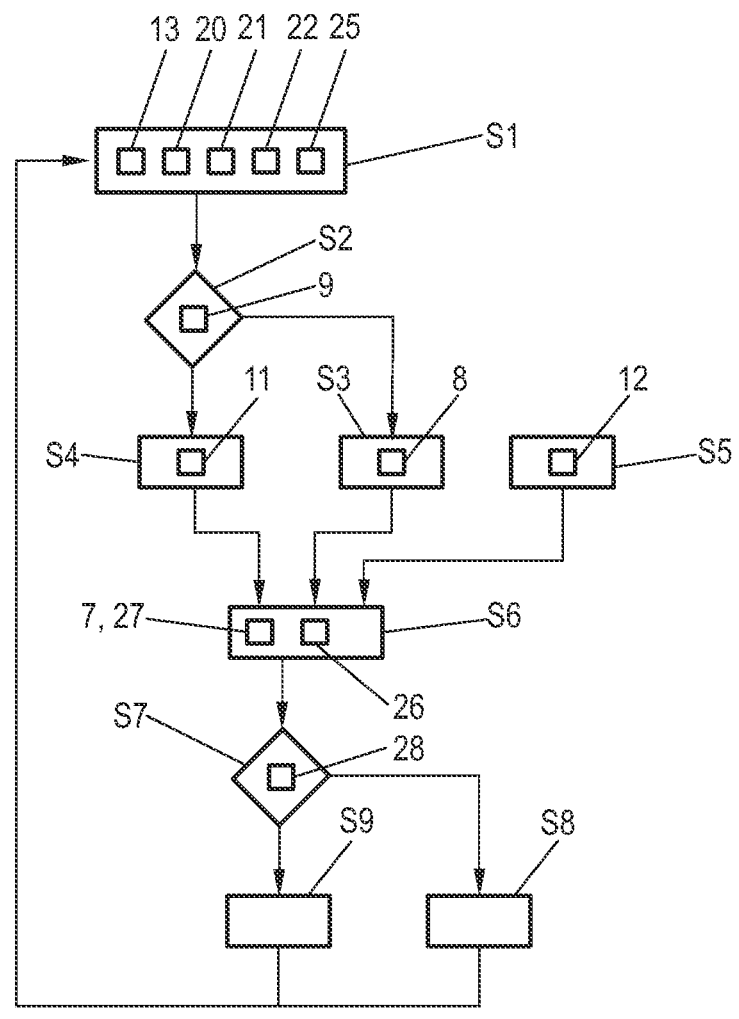
FIG. 2 shows a flow chart of an exemplary embodiment of the method according to the disclosure.

In the flow chart shown in FIG. 2, in step S1, at first various parameters of the motor vehicle are detected. By the wheel revolution sensors 14, the number of revolutions 13 of the different wheels 4 are detected, in particular making use of multiple wheel revolution sensors 14 for each wheel 4, in order to enable a redundant detection. Furthermore, the speed 20 of the motor vehicle 1 is determined, for which the number of wheel revolutions 13 on a nondriven axle can be used, and/or further information, such as the data of an acceleration sensor, not shown, can be evaluated.

Furthermore, the actual torque 21 is provided by an engine controller of the first drive machine 2 and a power electronics associated with the second drive machine 3 to the control device 6. Information 22 about the functional state of the motor slip control 10 is also detected. A monitoring is done to determine whether the motor slip control is inactive, e.g., on account of user setting, or whether the integrity of the motor slip control is disrupted. Merely as an example, flags can be evaluated for this, indicating whether a watchdog timer is indicating a correct operation of a subdevice 15 of the control device 6 implementing the motor slip control, and/or whether redundant detection or computation pathways show signs of deviations or an unexpected behavior was detected during previous interventions of the motor slip control. In addition, the state of charge 25 of an energy accumulator 24 of the motor vehicle 1 is detected in the example.

In step S2, an error condition 9 is checked, the fulfillment of which indicates a malfunction of the motor slip control 10. For this, the state information 22 can be evaluated.

If the error condition is not fulfilled in step S2, then in step S3 a first limit value for an amount of increase 7 is dictated, by which the load point of the first drive machine 2 should be increased in a normal operation.

But if the error condition is fulfilled in step S2, a second limit value 11 for the amount of increase 7 will be dictated instead in step S4 in a fault operation, being significantly smaller than the first amount of increase 8.

As already discussed in the general portion of the specification, the relatively low second limit value 11 means that, even upon failure of the motor slip control and no torque provided by the first drive machine 2, the negative torques on the wheels 4 cannot result in an uncontrollable destabilization of the motor vehicle. On the other hand, if the motor slip control is fully operable, the higher limit values 8 can also be used on account of its possible fast interventions, but these should typically be chosen sufficiently small so that no destabilization occurs on a wet roadway.

In step S5, a total torque demand 12 is set, dictated for example on the basis of the driver's wishes or an operator input of the driver on the operator device 20 of the motor vehicle 1 or based on a torque demand of a system 23 driving the motor vehicle 1 in at least partly automated manner. The total torque demand can furthermore depend on further parameters, such as additional requirements from driver assist systems or stability controls, as is already known in itself.

In step S6, a nominal torque 26 is set for the first drive machine 2 and a nominal torque 27 for the second drive machine 3, the nominal torque for the second drive machine 3 corresponding to the amount of increase 7 for the increasing of the load point of the first drive machine 2 during the explained generator operation. Such a procedure is already known in itself, and thanks to the shifting of the load point of the first drive machine 2 this can be operated in particular in an especially efficient torque or speed range, while the state of charge 25 of the energy accumulator 24 can be taken into account, as is usual. However, the optimization in the illustrated method or motor vehicle is done under the boundary condition that the amount of increase 7 or the torque demand 27 for the second drive machine 3 does not exceed the first limit value 8 in normal operation and the second limit value 11 in fault operation.

In step S7, a triggering condition 28 is checked, and an intervention by the motor slip control should occur if it is fulfilled. The triggering condition 28 can be fulfilled, for example, if the differences in the number of wheel revolutions 13 between a driven and a nondriven axle exceed a limit value or if the number of wheel revolutions 13 of at least one of the wheels 4 is significantly below an expected value, resulting from the speed of the vehicle 20. It should be noted that, although step S7 is shown as part of the flow chart for a better understanding, it is also possible to perform step S7 and the potentially triggered step S9 in parallel and on occasion also with higher rate of repetition than the other steps in order to make possible a fast intervention of the motor slip control 10.

If the triggering condition 28 is not fulfilled, then in step S8 the drive machines 2, 3 will be actuated according to the nominal torques 26, 27. But if the triggering condition 28 is fulfilled, on the one hand the amount of increase 7 or the torque setting 27 for the second drive machine 3 will be reduced, so that the load point of the first drive machine 2 will be increased less, or the generator operation will be entirely terminated, in particular, and in addition the first drive machine 2 can be actuated to increase the provided torque, so that excessive slippage of the wheels 4 can be prevented on account of high negative torques.

As already explained in the general portion, at least the evaluation 17 of the error condition 9 and the limiting 18 of the amount of increase 7 to the respective limit value 8, 11 and thus ultimately the setting 19 of the nominal torques 26, 27 as well should be implemented with high integrity requirement, while the integrity requirements for detecting the actual torque 21 or for the motor slip control 10 can be less. Therefore, the mentioned functions can be formed by a subdevice 16 of the control device 6 with especially high integrity, for example by use of suitable redundancies, while the motor slip control can also be implemented with a subdevice 15 of the control device 6 having a lower integrity requirement.

Thanks to the method according to the disclosure, higher generator load point shifts can be used for the first drive machine 2 in the motor vehicle 1 or in the method explained in regard to FIG. 2 whenever the motor slip control 10 is fully operable, i.e., in practically all vehicles over their entire operating time, so that the overall efficiency of the operation of the motor vehicle 1 can be enhanced.

Figure 3:
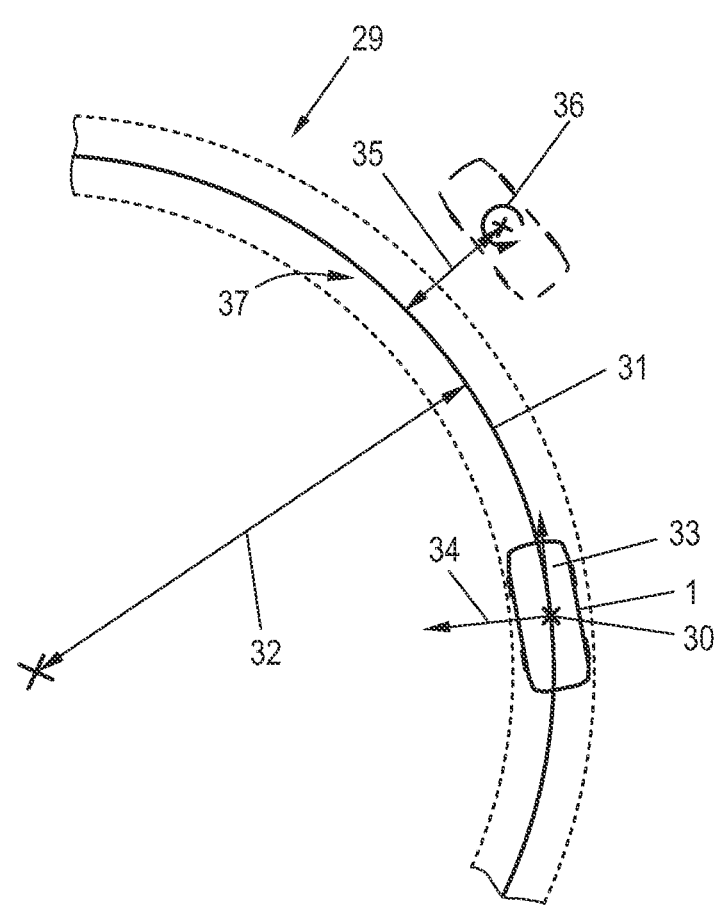
FIG. 3 shows a test driving situation in which a destabilization of the motor vehicle occurs.

FIG. 3 shows as an example a first test driving situation 29, in which a destabilization of the motor vehicle occurs when the driving torque of the first drive machine 2 is reduced to zero, while the amount of increase 7 is set at the first limit value 8 and at the same time the motor slip control of the motor vehicle is not active or not operable. The motor vehicle is being driven along a section of a circular path 31, while the speed 33 of the motor vehicle 1 and the radius 32 of the circular path 31 are chosen such that the ratio between the centripetal force 34 needed to drive the motor vehicle 1 on the circular path 31 and the product of the normal force transferred by the wheels 4 of the motor vehicle 1 to a roadway 37 being driven upon times the coefficient of friction of the static friction between the tires 4 of the motor vehicle 1 and the roadway 37 takes on a given nominal ratio. In the first driving situation, a wet roadway is used, for example, where a coefficient of friction between 0.7 and 0.9 results, for example. The nominal ratio can lie in the region between 0.65 and 0.85. The limit value 8 or the amount of increase 7 can now be increased in stages in successive test drives or simulation runs, starting from zero, for example, until a destabilization of the motor vehicle occurs. A destabilization is recognized precisely when, one second after reducing the driving torque of the first drive machine to zero or the activating of the momentary fault, on the one hand a yaw rate deviation of the yaw rate 36 of the motor vehicle about its vertical axis from the yaw rate which would result from driving on the circular path is greater than a limit value of 4°/s and/or on the other hand a distance value 35 of the motor vehicle, especially the center of gravity 30 of the motor vehicle, from the circular path 31 is greater than 50 cm.

The first limit value is furthermore chosen such that no destabilization of the motor vehicle occurs during a test driving situation on a dry roadway.

The explained choice of the first limit value such that a destabilization is permissible during wet conditions is especially advisable, as already explained in the general section, when the motor slip control has an integrity of ASIL-C. If, on the other hand, the motor slip control has an integrity of ASIL-B, it is typically advisable to carry out or simulate a drive on ice of snow in the first test driving situation and to select the first limit value such that no destabilization results in a third test driving situation on a wet roadway.

The second limit value is preferably chosen such that no destabilization results in the first test driving situation or when driving on snow or ice.

German patent application no. 102022118620.2, filed Jul. 26, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A motor vehicle comprising:
a first drive machine that is an internal combustion engine;
a second drive machine that is as an electric machine; and
a control device that, in operation, controls the first drive machine and the second drive machine in at least a normal operation mode and a fault operation mode of the motor vehicle such that the first drive machine propels the motor vehicle, while the second drive machine operates as a generator and increases a load of the first drive machine by an amount of increase,
wherein, in the normal operation mode, the control device controls the second drive machine such that the amount of increase of the load of the first drive machine does not exceed a first limit value, and the control device performs a motor slip control of the motor vehicle in which additional torques are applied to the second drive machine or negative torques of the second drive machine are reduced to prevent destabilization of the motor vehicle,
wherein, in the fault operation mode, the control device controls the second drive machine such that the amount of increase of the load of the first drive machine does not exceed a second limit value that is smaller than the first limit value, and the control device does not perform the motor slip control of the motor vehicle,
wherein the control device, in operation, switches between controlling the first drive machine and the second drive machine in the normal operation mode and controlling the first drive machine and the second drive machine in the fault operation mode based on a number of wheel revolutions of at least one wheel of the motor vehicle that is detected by a wheel revolution sensor of the motor vehicle,
wherein the first limit value is chosen such that, when a driving torque of the first drive machine is reduced to zero, while the amount of increase is set at the first limit value and at a same time the control device does not perform the motor slip control of the motor vehicle, destabilization of the motor vehicle occurs in a first test driving situation corresponding to the motor vehicle being driven on a wet roadway and no destabilization of the motor vehicle occurs in a second test driving situation corresponding to the motor vehicle being driven on a dry roadway, and
wherein the second limit value is chosen such that, when the driving torque of the first drive machine is reduced to zero, while the amount of increase is set at the second limit value and at the same time the control device does not perform the motor slip control of the motor vehicle, no destabilization of the motor vehicle occurs in the first test driving situation corresponding to the motor vehicle being driven on the wet roadway.

2. The motor vehicle according to claim 1, wherein the control device, in operation, checks for an error condition,
wherein fulfillment of the error condition indicates a malfunction or an inactive state of the motor slip control, and
wherein, upon fulfillment of the error condition, the control device switches to the fault operation mode.

3. The motor vehicle according to claim 2, wherein the control device or a subdevice of the control device evaluates the error condition or limits the amount of increase to the second limit value with higher integrity requirements than control or monitoring of driving torques provided by the first drive machine or the motor slip control.

4. The motor vehicle according to claim 2, wherein the fulfillment of the error condition or a response of the motor slip control is based on the number of wheel revolutions of the at least one wheel that is detected by the wheel revolution sensor.

5. The motor vehicle according to claim 1,
wherein, when the motor vehicle in the first test driving situation and the second test driving situation is being driven along a section of a circular path, while a speed of the motor vehicle and a radius of the circular path are chosen such that a ratio between a centripetal force needed to drive the motor vehicle on the circular path and a product of a normal force transferred by tires of the motor vehicle to a roadway being driven upon times a coefficient of friction of a static friction between the tires of the motor vehicle and the roadway takes on a given ratio,
wherein, in the first test driving situation, the coefficient of friction is between 0.4 and 0.9 and the given ratio is between 0.65 and 0.9, and
wherein, in the second test driving situation, the coefficient of friction is between 0.9 and 1.1 and the given ratio is between 0.4 and 0.6.

6. The motor vehicle according to claim 5, wherein, in the first test driving situation, either the coefficient of friction is between 0.4 and 0.6 and the given ratio is between 0.7 and 0.9 or the coefficient of friction is between 0.7 and 0.9 and the given ratio is between 0.65 and 0.85.

7. The motor vehicle according to claim 5, wherein, in the first test driving situation, the coefficient of friction is between 0.4 and 0.6 and the given ratio is between 0.7 and 0.9, while the first limit value is chosen such that, when the driving torque of the first drive machine is reduced to zero, while the amount of increase is set at the first limit value and at the same time the motor slip control of the motor vehicle is not active or not operable, no destabilization of the motor vehicle occurs in a third test driving situation, the motor vehicle in the third test driving situation being driven along the section of the circular path, while the coefficient of friction is between 0.7 and 0.9 and the given ratio is between 0.65 and 0.85.

8. The motor vehicle according to claim 7, wherein the second limit value is chosen such that, when the driving torque of the first drive machine is reduced to zero, while the amount of increase is set at the second limit value and at the same time the control device does not perform the motor slip control of the motor vehicle, no destabilization of the motor vehicle occurs in a fourth test driving situation, the motor vehicle in the fourth test driving situation being driven along the section of the circular path, wherein the coefficient of friction is between 0.4 and 0.6 and the given ratio is between 0.7 and 0.9.

9. The motor vehicle according to claim 1, wherein the amount of increase is reduced to zero when the motor slip control responds to a reduction of a wheel torque.

10. The motor vehicle according to claim 1, wherein the control device, in operation, dictates the amount of increase based on a total torque demand dictated by an operator input to an operator device or by a system that, in operation, at least partly automates driving of the motor vehicle.

11. A method for operating a motor vehicle having a first drive machine that is an internal combustion engine and a second drive machine that is an electric machine, the method comprising:

controlling the first drive machine and the second drive machine in at least a normal operation mode and a fault operation mode of the motor vehicle such that the first drive machine propels the motor vehicle, while the second drive machine operates as a generator and increases a load of the first drive machine by an amount of increase; and switching between controlling the first drive machine and the second drive machine in the normal operation mode and controlling the first drive machine and the second drive machine in the fault operation mode based on a number of wheel revolutions of at least one wheel of the motor vehicle that is detected by a wheel revolution sensor of the motor vehicle, wherein, in the normal operation mode, the controlling controls the second drive machine such that the amount of increase of the load of the first drive machine does not exceed a first limit value and a motor slip control of the motor vehicle is performed applying additional torques to the second drive machine or reducing negative torques of the second drive machine to prevent destabilization of the motor vehicle, wherein, in the fault operation mode, the controlling controls the second drive machine such that the amount of increase of the load of the first drive machine does not exceed a second limit value that is smaller than the first limit value, and the motor slip control of the motor vehicle is not performed, wherein the first limit value is chosen such that, when a driving torque of the first drive machine is reduced to zero, while the amount of increase is set at the first limit value and at a same time a motor slip control of the motor vehicle is performed, destabilization of the motor vehicle occurs in a first test driving situation corresponding to the motor vehicle being driven on a wet roadway and no destabilization of the motor vehicle occurs in a second test driving situation corresponding to the motor vehicle being driven on a dry roadway, and wherein the second limit value is chosen such that, when the driving torque of the first drive machine is reduced to zero, while the amount of increase is set at the second limit value and at the same time the motor slip control of the motor vehicle is not performed, no destabilization of the motor vehicle occurs in the first test driving situation corresponding to the motor vehicle being driven on the wet roadway.

12. The method according to claim 11, further comprising:

checking for an error condition, wherein fulfillment of the error condition indicates a malfunction or an inactive state of the motor slip control; and upon fulfillment of the error condition, switching to the fault operation mode.

13. The method according to claim 12, wherein the amount of increase for at least part of a time interval within which the normal operation mode occurs is greater than the second limit value.

14. The method according to claim 11, wherein, when the motor vehicle in the first test driving situation and the second test driving situation is being driven along a section of a circular path, while a speed of the motor vehicle and a radius of the circular path are chosen such that a ratio between a centripetal force needed to drive the motor vehicle on the circular path and a product of a normal force transferred by tires of the motor vehicle to a roadway being driven upon times a coefficient of friction of a static friction between the tires of the motor vehicle and the roadway takes on a given ratio, wherein, in the first test driving situation, the coefficient of friction is between 0.4 and 0.9 and the given ratio is between 0.65 and 0.9, and wherein, in the second test driving situation, the coefficient of friction is between 0.9 and 1.1 and the ratio is given between 0.4 and 0.6.

* * * * *